United States Patent
Itoh et al.

(10) Patent No.: US 9,366,575 B2
(45) Date of Patent: Jun. 14, 2016

(54) TEMPERATURE MEASURING APPARATUS AND TEMPERATURE MEASURING METHOD

(71) Applicant: Panasonic Intellectual Property Corporation of America, Torrance, CA (US)

(72) Inventors: Tatsuo Itoh, Osaka (JP); Shinichi Shikii, Nara (JP); Koichi Kusukame, Nara (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 1 day.

(21) Appl. No.: 14/414,977

(22) PCT Filed: Apr. 28, 2014

(86) PCT No.: PCT/JP2014/002358
§ 371 (c)(1),
(2) Date: Jan. 15, 2015

(87) PCT Pub. No.: WO2014/185024
PCT Pub. Date: Nov. 20, 2014

(65) Prior Publication Data
US 2015/0168219 A1    Jun. 18, 2015

(30) Foreign Application Priority Data

May 17, 2013   (JP) ................................. 2013-105303

(51) Int. Cl.
*G01J 5/08* (2006.01)
*H04N 5/33* (2006.01)
(Continued)

(52) U.S. Cl.
CPC ............ *G01J 5/0806* (2013.01); *G01J 5/0025* (2013.01); *G01J 5/089* (2013.01); *G01J 5/0896* (2013.01);
(Continued)

(58) Field of Classification Search
CPC ....... G01J 5/0025; G01J 5/0806; G01J 5/089; G01J 5/0896; G06K 9/00221; G06K 9/00362; H04N 5/2259; H04N 5/23212; H04N 5/23219; H04N 5/33
See application file for complete search history.

(56) References Cited

U.S. PATENT DOCUMENTS

| 5,172,978 A | 12/1992 | Nomura et al. |
| 7,034,300 B2 | 4/2006 | Hamrelius et al. |
| 2004/0124359 A1 | 7/2004 | Hamrelius et al. |

FOREIGN PATENT DOCUMENTS

| JP | 4-15024 | 2/1992 |
| JP | 2004-525583 | 8/2004 |

(Continued)

OTHER PUBLICATIONS

International Search Report issued Jul. 8, 2014 in corresponding International Application No. PCT/JP2014/002358.

*Primary Examiner* — Mark R Gaworecki
(74) *Attorney, Agent, or Firm* — Wenderoth, Lind & Ponack, L.L.P.

(57) ABSTRACT

A temperature measuring apparatus includes: an infrared measuring unit; a guide light emitting unit; an optical unit that (i) allows the guide light emitted by the guide light emitting unit to travel toward the object, and (ii) allows the infrared radiation radiated from the object to enter the infrared measuring unit; a position adjusting unit that makes a position adjustment of irradiating the measurement target region with the guide light emitted by the guide light emitting unit while keeping within a predetermined range a misalignment between an optical axis of the infrared radiation entering the infrared measuring unit from the measurement target region and an optical axis of the guide light emitted by the guide light emitting unit; and a focusing unit that adjusts a focus of the infrared measuring unit and a focus of the guide light emitting unit.

15 Claims, 13 Drawing Sheets

(51) Int. Cl.
*H04N 5/225* (2006.01)
*H04N 5/232* (2006.01)
*G01J 5/00* (2006.01)
*G06K 9/00* (2006.01)

(52) U.S. Cl.
CPC ......... *H04N 5/2259* (2013.01); *H04N 5/23212* (2013.01); *H04N 5/23219* (2013.01); *H04N 5/33* (2013.01); *G06K 9/00221* (2013.01); *G06K 9/00362* (2013.01)

(56) References Cited

FOREIGN PATENT DOCUMENTS

| | | |
|---|---|---|
| JP | 2009-2739 | 1/2009 |
| JP | 2010-230392 | 10/2010 |
| JP | 2012-177560 | 9/2012 |
| WO | 02/091735 | 11/2002 |

TEMPERATURE MEASURING APPARATUS AND TEMPERATURE MEASURING METHOD

TECHNICAL FIELD

The present invention relates to a temperature measuring apparatus and a temperature measuring method for measuring a temperature of an object.

BACKGROUND ART

As a temperature measuring apparatus for measuring a temperature of an object, a radiation thermometer has been known, for example (see Patent Literature (PTL) 1, for example). The radiation thermometer receives infrared radiation radiated from a surface of the object using an infrared sensor, and measures an infrared intensity to determine the temperature of the object.

In addition, as such a temperature measuring apparatus, a human body temperature measuring apparatus has also been proposed that measures the temperature of a part of a human body in a noncontact manner (see PTL 2, for example). In the human body temperature measuring apparatus disclosed by PTL 2, a photographed image is utilized to contain a human body to be measured within a measurement field of view, thereby measuring the temperature of a part of the human body.

CITATION LIST

Patent Literature

[PTL 1] Japanese Unexamined Patent Application Publication No. 2009-2739
[PTL 2] Japanese Unexamined Patent Application Publication No. 2010-230392

SUMMARY OF INVENTION

Technical Problem

However, PTL 2 mentioned above has given no consideration to influences of the temperature of an object within the field of view other than the human body. In order to measure the temperature of a human body more accurately, further technological studies have to be made.

With the foregoing in mind, it is an object of the present invention to provide a temperature measuring apparatus and a temperature measuring method for accurately measuring a temperature of a measurement target object.

Solution to Problem

In order to achieve the object mentioned above, a temperature measuring apparatus according to one aspect of the present invention includes: an infrared measuring unit configured to measure infrared radiation radiated from a measurement target region of an object; a guide light emitting unit configured to emit guide light; an optical unit configured to (i) reflect or transmit the guide light emitted by the guide light emitting unit to allow the guide light to travel toward the object, and (ii) transmit or reflect the infrared radiation radiated from the object to allow the infrared radiation to enter the infrared measuring unit; a position adjusting unit configured to make a position adjustment of irradiating the measurement target region with the guide light emitted by the guide light emitting unit while keeping within a predetermined range a misalignment between an optical axis of the infrared radiation entering the infrared measuring unit from the measurement target region and an optical axis of the guide light emitted by the guide light emitting unit; and a focusing unit configured to adjust a focus of the infrared measuring unit and a focus of the guide light emitting unit. The focusing unit is configured to adjust the focus of the guide light emitting unit and then adjust the focus of the infrared measuring unit.

It should be noted that these general or specific aspects may be implemented by a system, a method, an integrated circuit, a computer program or a computer-readable recording medium such as a CD-ROM, or by any combination of a system, a method, an integrated circuit, a computer program and a recording medium.

Advantageous Effects of Invention

With the temperature measuring apparatus and so on according to the present invention, it becomes possible to accurately measure the temperature of a measurement target object.

DESCRIPTION OF EMBODIMENTS (Underlying Knowledge Forming Basis of the Present Invention)

The following is a description of the underlying knowledge forming the basis of the present invention.

Figure 16:
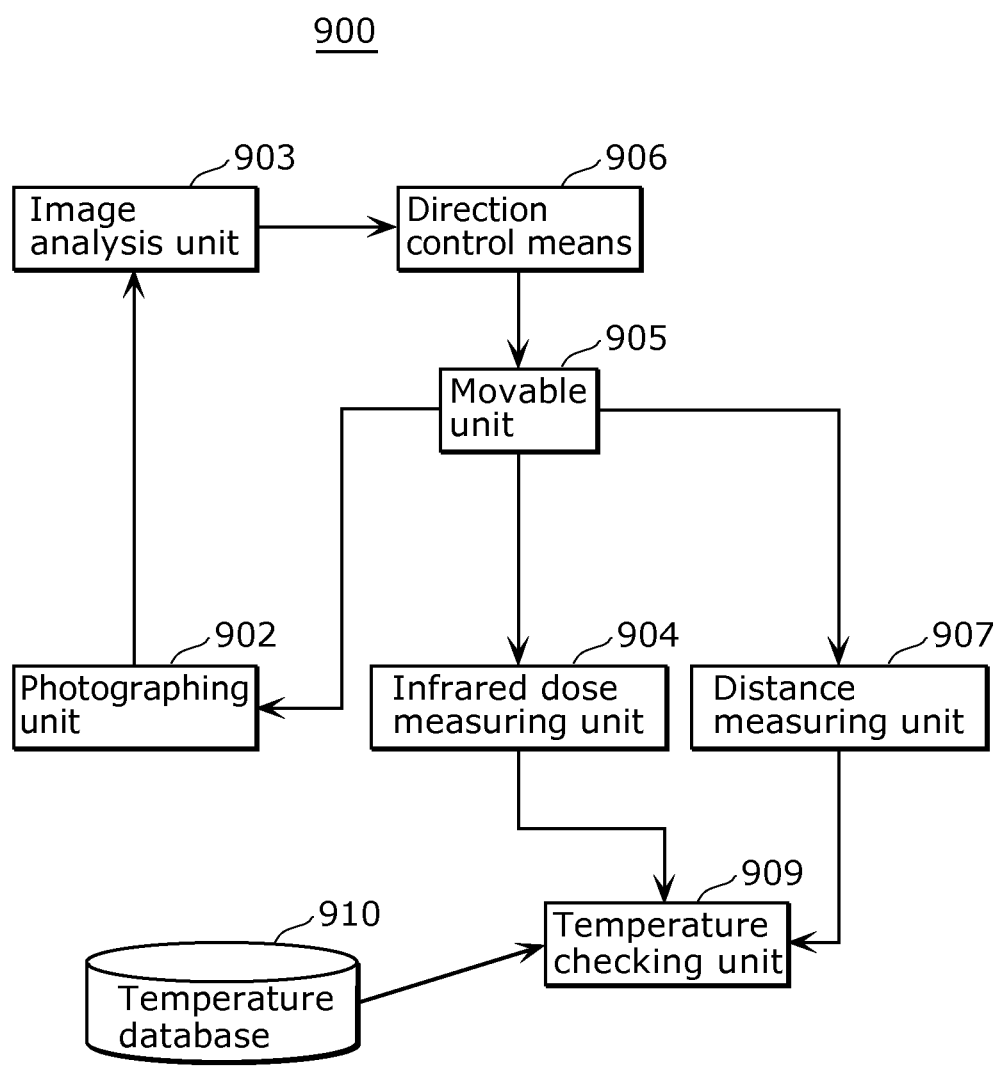
FIG. 16 illustrates a configuration of a conventional temperature measuring apparatus.

FIG. 16 illustrates a configuration of a conventional temperature measuring apparatus.

A human body temperature measuring apparatus 900 illustrated in FIG. 16 is the temperature measuring apparatus described in PTL 2. This human body temperature measuring apparatus 900 includes a photographing unit 902, an image analysis unit 903, an infrared dose measuring unit 904, a movable unit 905, a direction control means 906, a distance measuring unit 907, a temperature checking unit 909, and a temperature database 910.

The human body temperature measuring apparatus 900 causes the photographing unit 902 to photograph an image and the image analysis unit 903 to analyze the image. The photographing unit 902, the infrared dose measuring unit 904, and the distance measuring unit 907 are mounted on the movable unit 905, and controlled by the direction control means 906 based on the analyzed image so as to face a desired portion of a human body. The distance measuring unit 907 measures the distance between the infrared dose measuring unit 904 and the desired human body portion to be measured.

The human body temperature measuring apparatus 900 determines the temperature of the human body from an infrared dose measured by the infrared dose measuring unit 904 and distance information measured by the distance measuring unit 907 via the temperature database 910.

Here, the temperature is corrected with the distance information measured by the distance measuring unit 907 because the field of view of the infrared dose measuring unit 904 expands in keeping with the distance. In other words, when the distance increases, not only the human body portion to be measured but also an object surrounding the human body comes into the field of view, so that a detected temperature is an average temperature of the human body and the object surrounding the human body that are present in the field of view.

However, even if the temperature is corrected based on the temperature database using only the information regarding the distance as in the human body temperature measuring apparatus 900, the temperature of the measurement target object cannot be measured accurately.

This is because the human body temperature measuring apparatus 900 has no advance information regarding the temperature of the object within the field of view other than the human body. For instance, the temperature of a wall surface surrounding a measurement target region of the human body may be similar to an ambient temperature, or the temperature of an object surrounding the measurement target region may be higher than a body temperature (for example, the temperature of a hand is measured when a person is holding a hot cup). Thus, even if temperature information of the human body and the object other than the human body that are present within the field of view is corrected based on the temperature database using only the information regarding the distance, accurate temperature information cannot be obtained.

In order to solve the problem described above, a temperature measuring apparatus according to one aspect of the present invention includes: an infrared measuring unit configured to measure infrared radiation radiated from a measurement target region of an object; a guide light emitting unit configured to emit guide light; an optical unit configured to (i) reflect or transmit the guide light emitted by the guide light emitting unit to allow the guide light to travel toward the object, and (ii) transmit or reflect the infrared radiation radiated from the object to allow the infrared radiation to enter the infrared measuring unit; a position adjusting unit configured to make a position adjustment of irradiating the measurement target region with the guide light emitted by the guide light emitting unit while keeping within a predetermined range a misalignment between an optical axis of the infrared radiation entering the infrared measuring unit from the measurement target region and an optical axis of the guide light emitted by the guide light emitting unit; and a focusing unit configured to adjust a focus of the infrared measuring unit and a focus of the guide light emitting unit. The focusing unit is configured to adjust the focus of the guide light emitting unit and then adjust the focus of the infrared measuring unit.

This configuration allows temperature measurement impervious to the distance between the infrared measuring unit and the measurement target region, so that the temperature of the measurement target region can be measured accurately, making it possible to achieve the temperature measuring apparatus capable of measuring the temperature of the measurement target object accurately.

More specifically, the optical unit is used to both align the optical axes of the guide light emitting unit and the infrared measuring unit and achieve foci of the guide light emitting unit and the infrared measuring unit, thereby minimizing a field of view of the infrared measuring unit in the measurement target region of the object. This allows the temperature measurement impervious to a surrounding temperature of the measurement target region.

Also, by using the optical unit, the infrared sensor is impervious to near infrared radiation serving as guide light.

Further more, for example, the focusing unit may be configured to: adjust the focus of the guide light emitting unit by making an adjustment of minimizing a spot diameter of the guide light with which the measurement target region is irradiated, and after adjusting the focus of the guide light emitting unit, adjust the focus of the infrared measuring unit based on a result of adjusting the focus of the guide light emitting unit.

Moreover, for example, the position adjusting unit may include a rotary driving unit configured to rotate the infrared measuring unit, the guide light emitting unit, and the optical unit in panning and tilting directions, and the position adjusting unit may be configured to make the position adjustment by controlling the rotary driving unit so as to rotary-drive the infrared measuring unit, the guide light emitting unit, and the optical unit in the panning and tilting directions.

Here, for example, the temperature measuring apparatus may further include: an imaging unit configured to capture an image of the object; and an image processing unit configured to process the image captured by the imaging unit. The position adjusting unit may be configured to make the position adjustment of irradiating the measurement target region with the guide light emitted by the guide light emitting unit by controlling the rotary driving unit according to an output of the image processing unit so as to rotary-drive the infrared measuring unit, the guide light emitting unit, and the optical unit in the panning and tilting directions.

This configuration makes it possible to photograph a subject including the object irradiated with the guide light by the imaging unit and use the photographed image, so that the measurement target region and the position irradiated with the guide light can be aligned. Thus, the measurement target region can be measured precisely.

Furthermore, for example, the guide light emitting unit may be configured to emit near infrared light to which the imaging unit is sensitive.

Also, for example, the infrared measuring unit may include an infrared sensor, and an infrared lens that is disposed on a same optical axis as the infrared sensor. The guide light emitting unit may include a near infrared light source, and a near infrared lens that is disposed on a same optical axis as the near infrared light source. The focusing unit may include: a first focusing unit configured to adjust the focus of the guide light emitting unit by varying a distance between the near infrared light source and the near infrared lens; and a second focusing unit configured to adjust the focus of the infrared measuring unit by varying a distance between the infrared sensor and the infrared lens after the first focusing unit adjusts the focus of the guide light emitting unit.

Here, for example, the first focusing unit may be configured to vary the distance between the near infrared light source and the near infrared lens to minimize a spot diameter of the guide light with which the measurement target region is irradiated, and the second focusing unit may be configured to vary the distance between the infrared sensor and the infrared lens according to the distance varied by the first focusing unit.

Moreover, for example, the infrared lens and the near infrared lens may have a same focal length, and the second focusing unit may be configured to vary the distance between the infrared sensor and the infrared lens to be equal to the distance between the near infrared light source and the near infrared lens varied by the first focusing unit.

Also, for example, the temperature measuring apparatus may further include a lens that is disposed between the optical unit and the object and located on a same optical axis as the infrared measuring unit. The infrared measuring unit may include an infrared sensor. The guide light emitting unit may include a near infrared light source, and is configured to emit near infrared guide light. The lens may (i) transmit the guide light that has left the optical unit to allow the guide light to travel toward the object, and (ii) transmit the infrared radiation radiated from the object to allow the infrared radiation to enter the optical unit. The focusing unit may be configured to adjust the focus of the guide light emitting unit and the focus of the infrared measuring unit by varying a position of at least the lens.

Here, for example, the focusing unit may be configured to adjust the focus of the guide light emitting unit by varying a distance between the lens and the near infrared light source to minimize a spot diameter of the guide light with which the measurement target region is irradiated, and then adjust the focus of the infrared measuring unit by varying a position of the infrared sensor to vary a distance between the infrared sensor and the lens.

Here, for example, the focusing unit may be configured to adjust the focus of the guide light emitting unit by varying a distance between the lens and the near infrared light source to minimize a spot diameter of the guide light with which the measurement target region is irradiated, and then adjust the focus of the infrared measuring unit by varying a position of the lens to vary a distance between the infrared sensor and the lens.

It should be noted that these general or specific aspects may be implemented by a system, a method, an integrated circuit, a computer program or a computer-readable recording medium such as a CD-ROM, or by any combination of a system, a method, an integrated circuit, a computer program, and a recording medium.

The following is a description of embodiments of the present invention, with reference to the accompanying drawings.

It should be noted that any of the embodiments described below will illustrate one specific example of the present invention. The numerical values, shapes, materials, structural components, the arrangement and connection of the structural components, steps, and the order of the steps mentioned in the following embodiments are merely an example and not intended to limit the present invention. Further, among the structural components in the following embodiments, the one that is not recited in any independent claim exhibiting the most generic concept will be described as an arbitrary structural component.

[Embodiment 1]

[Configuration of Temperature Measuring Apparatus]

Figure 1:
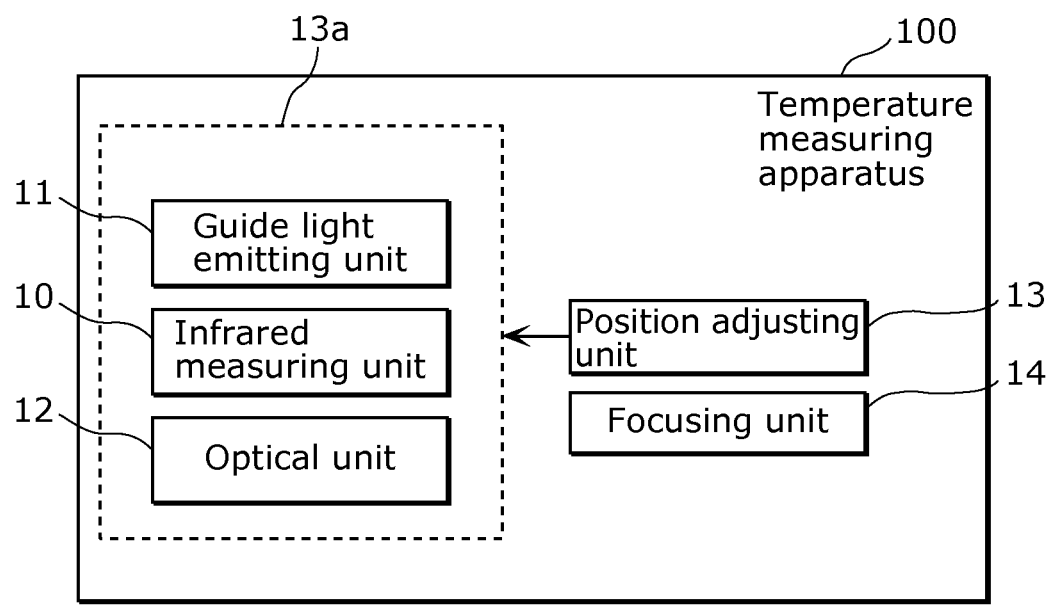
FIG. 1 illustrates an exemplary configuration of a temperature measuring apparatus in Embodiment 1.
Figure 2:
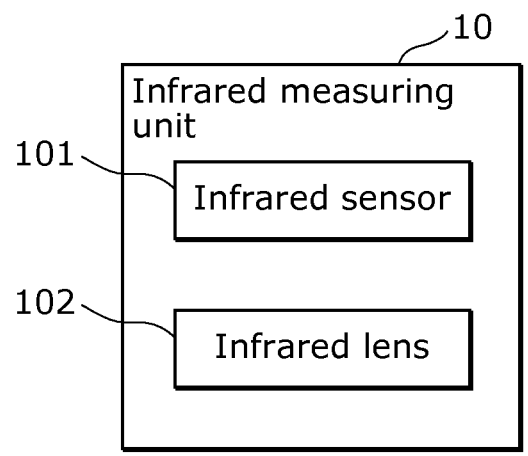
FIG. 2 illustrates an exemplary configuration of an infrared measuring unit in Embodiment 1.
Figure 3:
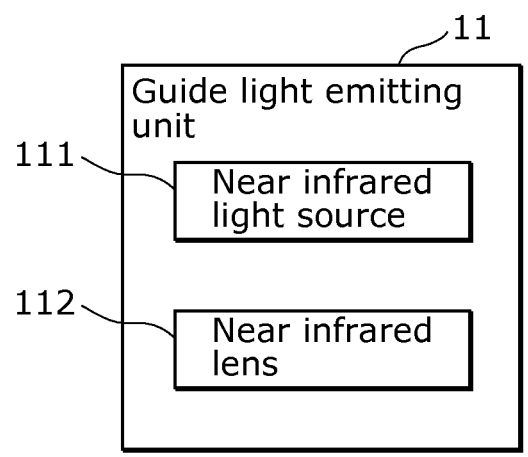
FIG. 3 illustrates an exemplary configuration of a guide light emitting unit in Embodiment 1.
Figure 4:
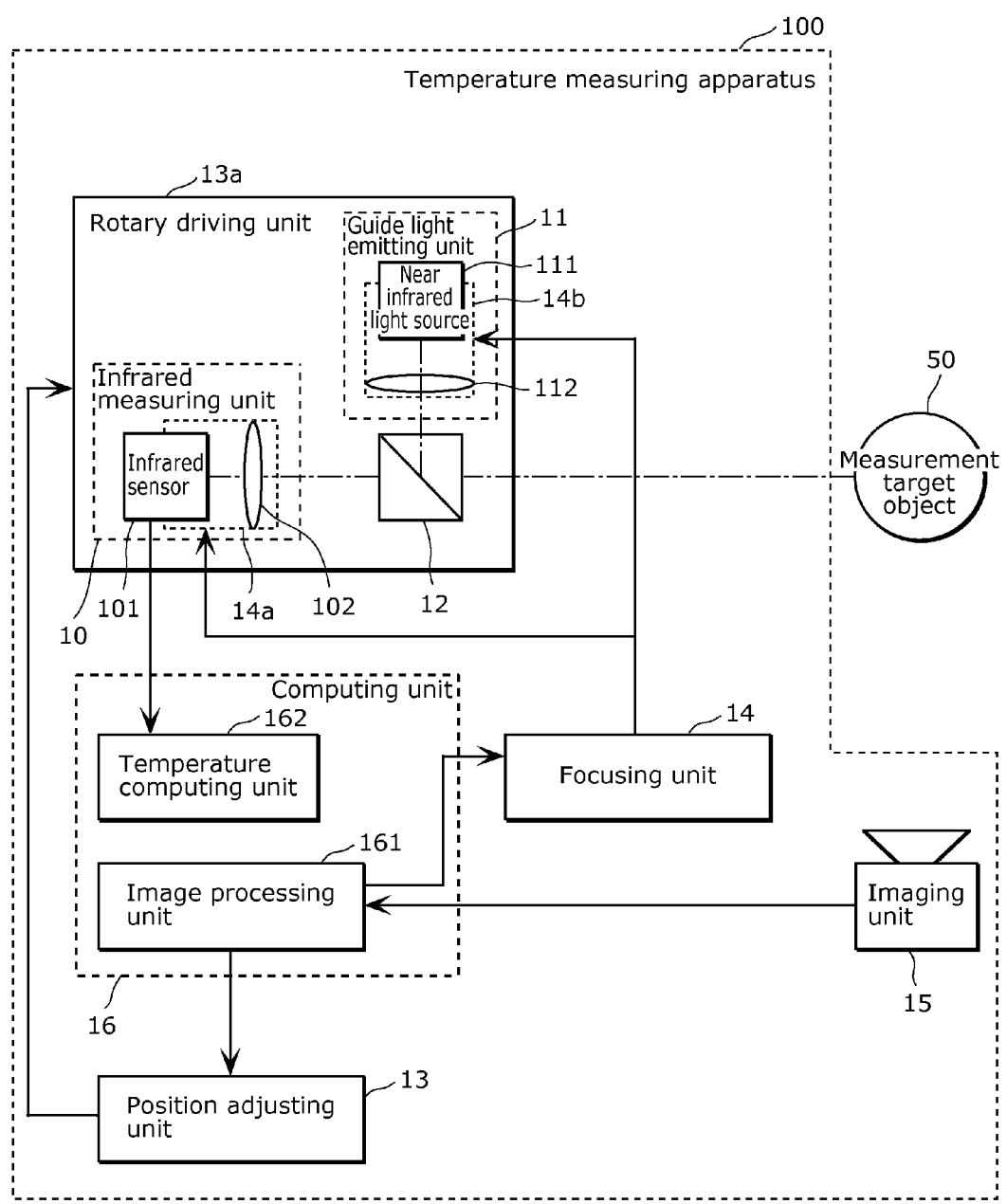
FIG. 4 illustrates one working example of the configuration of the temperature measuring apparatus in Embodiment 1.

FIG. 1 illustrates an exemplary configuration of a temperature measuring apparatus in Embodiment 1. FIG. 2 illustrates an exemplary configuration of an infrared measuring unit in Embodiment 1, and FIG. 3 illustrates an exemplary configuration of a guide light emitting unit in Embodiment 1. FIG. 4 illustrates one working example of the configuration of the temperature measuring apparatus in Embodiment 1.

A temperature measuring apparatus 100 illustrated in FIG. 1 includes at least an infrared measuring unit 10, a guide light emitting unit 11, an optical unit 12, a position adjusting unit 13, and a focusing unit 14. In the following description of the present embodiment, as illustrated in FIG. 4, the temperature measuring apparatus 100 includes an imaging unit 15 and a computing unit 16 in addition to the infrared measuring unit 10, the guide light emitting unit 11, the optical unit 12, the position adjusting unit 13, and the focusing unit 14. Incidentally, not all of these structural components are essential, and one or more of them may be omitted. Hereinafter, these structural components will be described individually.

[Configuration of Infrared Measuring Unit 10]

The infrared measuring unit 10 measures infrared radiation radiated from an object. More specifically, as illustrated in FIG. 2, the infrared measuring unit 10 includes at least an infrared sensor 101 and an infrared lens 102. In the present embodiment, as illustrated in FIG. 4, the infrared measuring unit 10 includes an infrared focusing mechanism 14a in addition to the infrared sensor 101 and the infrared lens 102.

The infrared sensor 101 is a sensor mainly sensitive to infrared radiation with a wavelength of 2 µm or longer.

The infrared lens 102 is a lens that is disposed on the same optical axis as the infrared sensor 101 and mainly transmits infrared radiation with a wavelength of 2 µm or longer. Here, the infrared lens 102 may have the same focal length as a near infrared lens 112, for example.

The infrared focusing mechanism 14a is a mechanism that is controlled by the focusing unit 14 and can vary the spacing between the infrared sensor 101 and the infrared lens 102 along the optical axis. The infrared focusing mechanism 14a can adjust the focus of the infrared measuring unit 10. More specifically, after a guide light focusing mechanism 14b adjusts the focus of the guide light emitting unit 11, the infrared focusing mechanism 14a varies the distance between the infrared sensor 101 and the infrared lens 102, thereby adjusting the focus of the infrared measuring unit 10. The infrared focusing mechanism 14a varies the distance between the infrared sensor 101 and the infrared lens 102 according to the distance between a near infrared light source 111 and a near infrared lens 112 that has been varied by the guide light focusing mechanism 14b. Here, when the infrared lens 102 and the near infrared lens 112 have the same focal length, the infrared focusing mechanism 14a varies the distance between the infrared sensor 101 and the infrared lens 102 so as to be equal to the distance between the near infrared light source 111 and the near infrared lens 112 varied by the guide light focusing mechanism 14b.

Incidentally, the arrangement and configuration of the infrared focusing mechanism 14a are not limited to those illustrated in FIG. 4 but may be any arrangement and configuration that can vary the spacing between the infrared lens 102 and the infrared sensor 101 along the optical axis. For example, a lens advancing mechanism or the like may be used as the infrared focusing mechanism 14a.

[Configuration of Guide Light Emitting Unit 11]

The guide light emitting unit 11 emits guide light. Here, the guide light emitting unit 11 emits near infrared light to which the imaging unit 15 is sensitive, for example. More specifically, as illustrated in FIG. 3, the guide light emitting unit 11 includes at least the near infrared light source 111 and the near infrared lens 112. In the present embodiment, as illustrated in FIG. 4, the guide light emitting unit 11 includes the guide light focusing mechanism 14b in addition to the near infrared light source 111 and the near infrared lens 112.

The near infrared light source 111 is configured by a laser, a light-emitting diode or the like, and emits near infrared radiation as guide light.

The near infrared lens 112 is disposed on the same optical axis as the near infrared light source 111, and mainly transmits infrared radiation (near infrared radiation) with a wavelength of 0.7 to 2.0 µm. The near infrared lens 112 transmits near infrared guide light emitted by the near infrared light source 111. Here, the near infrared lens 112 may have the same focal length as the infrared lens 102 as described above.

The guide light focusing mechanism 14b is a mechanism that is controlled by the focusing unit 14 and can vary the spacing between the near infrared light source 111 and the near infrared lens 112 along the optical axis. The guide light focusing mechanism 14b can adjust the focus of the guide light emitting unit 11. More specifically, the guide light focusing mechanism 14b varies the distance between the near infrared light source 111 and the near infrared lens 112, thereby adjusting the focus of the guide light emitting unit 11. The guide light focusing mechanism 14b varies the distance between the near infrared light source 111 and the near infrared lens 112 so as to minimize a spot diameter of guide light with which the measurement target region is irradiated.

Incidentally, the guide light focusing mechanism 14b is not limited to the one arranged as in FIG. 4 but may be any mechanism that can vary the spacing between the near infrared lens 112 and the near infrared light source 111 along the optical axis. For example, a lens advancing mechanism or the like may be used as the guide light focusing mechanism 14b.

[Configuration of Optical Unit 12]

The optical unit 12 reflects the guide light emitted by the guide light emitting unit 11 to allow it to travel toward a measurement target object 50, and transmits infrared radiation radiated from that measurement target object 50 to allow it to enter the infrared measuring unit 10.

More specifically, the optical unit 12 is configured by a wavelength selective prism or the like, and reflects near infrared light and transmits infrared light with a wavelength of 2 µm or longer. As illustrated in FIG. 4, the optical unit 12 is disposed at an intersection of the optical axis of the guide light emitted by the guide light emitting unit 11 and the optical axis of the infrared radiation entering the infrared measuring unit 10. The optical unit 12 reflects the guide light emitted by the guide light emitting unit 11 with a reflection angle of 90° to allow it to travel toward the measurement target object 50, and transmits the infrared radiation radiated from that measurement target object 50 to allow it to enter the infrared measuring unit 10.

Incidentally, the optical unit 12 may transmit the guide light emitted by the guide light emitting unit 11 to allow it to travel toward the measurement target object 50, and reflect the infrared radiation radiated from that measurement target object 50 to allow it to enter the infrared measuring unit 10. In this case, the positions of the infrared measuring unit 10 and the guide light emitting unit 11 illustrated in FIG. 4 are switched.

[Configuration of Position Adjusting Unit 13]

The position adjusting unit 13 makes a position adjustment of irradiating the measurement target region of the object with the guide light emitted from the guide light emitting unit 11 while keeping within a predetermined range a misalignment between the optical axis formed of the infrared measuring unit 10 and the infrared lens 102 and the optical axis of the guide light emitted by the guide light emitting unit 11. The position adjusting unit 13 includes a rotary driving unit 13a that rotates the infrared measuring unit 10, the guide light emitting unit 11, and the optical unit 12 in panning and tilting directions. The position adjusting unit 13 makes a position adjustment by controlling the rotary driving unit 13a so as to rotary-drive the infrared measuring unit 10, the guide light emitting unit 11, and the optical unit 12 in the panning and tilting directions.

In the present embodiment, as illustrated in FIG. 4, the position adjusting unit 13 controls the rotary driving unit 13a so that the irradiation position of the guide light and the measurement target region coincide with each other based on an output of an image processing unit 161. The position adjusting unit 13 controls the rotary driving unit 13a according to the output of the image processing unit 161 so as to rotary-drive the infrared measuring unit 10, the guide light emitting unit 11, and the optical unit 12 in the panning and tilting directions, thereby making a position adjustment of irradiating the measurement target region of the measurement target object 50 with the guide light emitted by the guide light emitting unit 11.

Here, as illustrated in FIG. 4, the infrared measuring unit 10, the guide light emitting unit 11, and the optical unit 12 are mounted on the rotary driving unit 13a. The rotary driving unit 13a is configured using, for example, a ball head or the like, and can rotate the infrared measuring unit 10, the guide light emitting unit 11, and the optical unit 12 in horizontal and vertical (panning and tilting) directions.

The relative position of the infrared measuring unit 10, the guide light emitting unit 11, and the optical unit 12 mounted on the rotary driving unit 13a satisfies the following positional relationship. That is, when an angle of the rotary driving unit 13a is set in an appropriate manner, the infrared measuring unit 10, the guide light emitting unit 11, and the optical unit 12 are arranged so that the misalignment between (i) the optical axis of the guide light that has been emitted from the guide light emitting unit 11 and reflected by the optical unit 12 and (ii) the optical axis of the infrared radiation that has passed through the optical unit 12 and enters the infrared measuring unit 10 is kept within a predetermined range.

Here, for example, the two optical axes noted above may be made coincide with each other as illustrated in FIG. 4. In this case, as illustrated in FIG. 4, the infrared measuring unit 10, the guide light emitting unit 11 and the optical unit 12 are arranged so that the optical axis of the guide light emitted by the guide light emitting unit 11 and the optical axis of the infrared radiation entering the infrared measuring unit 10 intersect at right angles.

[Configuration of Imaging Unit 15]

The imaging unit 15 captures an image of the object. More specifically, the imaging unit 15 captures an image of the subject including the measurement target object 50 illustrated in FIG. 4.

The imaging unit 15 is not limited particularly but may be any camera having a general imaging function. For example, the imaging unit 15 may be configured by a charge coupled device (CCD) camera, a complementary metal oxide semiconductor (CMOS) camera or the like.

Incidentally, the imaging unit 15 may be mounted on the rotary driving unit 13a. In this case, together with the infrared measuring unit 10, the guide light emitting unit 11, and the optical unit 12, the imaging unit 15 is rotary-driven by the rotary driving unit 13a.

[Configuration of Computing Unit 16]

The computing unit 16 is, for example, one or more microprocessors or the like, and not particularly limited as long as it performs a computation. In the present embodiment, as illustrated in FIG. 4, the computing unit 16 includes the image processing unit 161 and a temperature computing unit 162. Incidentally, the computing unit 16 may be provided in an apparatus separate from the temperature measuring apparatus 100. In this case, the temperature measuring apparatus 100 may include a communication means or a connecting means for communicating with or connecting to a separate external apparatus.

The image processing unit 161 processes the image captured by the imaging unit 15. In the present embodiment, the image processing unit 161 processes the image of the subject including the measurement target object 50 captured by the imaging unit 15, and extracts a desired measurement target region in the measurement target object 50. The image processing unit 161 extracts the desired measurement target region, for example, by pattern matching or by a skin color extracting method if the subject is a human body. The measurement target region is a region of the object whose temperature is to be measured by the infrared measuring unit 10, for example, a body region preset by a user.

The temperature computing unit 162 computes the temperature of the measurement target region of the measurement target object 50 from the infrared dose measured by the infrared sensor 101.

[Configuration of Focusing Unit 14]

The focusing unit 14 adjusts the foci of the infrared measuring unit 10 and the guide light emitting unit 11. The focusing unit 14 adjusts the focus of the guide light emitting unit 11 and then that of the infrared measuring unit 10. More specifically, the focusing unit 14 adjusts the focus of the guide light emitting unit 11 by making an adjustment of minimizing the spot diameter of the guide light with which the measurement target region is irradiated, and then adjusts the focus of the infrared measuring unit 10 based on the result of the focus adjustment of the guide light emitting unit 11.

In the present embodiment, the focusing unit 14 drives the guide light focusing mechanism 14b so as to minimize the spot size of the guide light on the measurement target object 50 photographed by the imaging unit 15. Also, the focusing unit 14 drives the infrared focusing mechanism 14a in association with the guide light focusing mechanism 14b so that, when the guide light is in focus (the spot size of the guide light is minimal), the infrared measuring unit 10 also achieves focus.

Here, the focus of the guide light and the focus of the infrared measuring unit 10 may be in association with each other. In this case, lenses having the same focal length are used respectively for the infrared lens 102 and the near infrared lens 112. By placing the infrared sensor 101 and the near infrared light source 111 at the respective foci of the infrared lens 102 and the near infrared lens 112, both achieve focus at infinity, in this state, where $\Delta x$ indicates a movement amount of the near infrared lens 112 when the near infrared lens 112 is moved so as to minimize the spot diameter of the guide light on the measurement target object 50, the infrared lens 102 can also be moved by $\Delta x$ in the same direction, thereby allowing both to achieve focus.

[Operation of Temperature Measuring Apparatus 100]

Now, referring to FIG. 5, the operation of the temperature measuring apparatus 100 configured as above will be described.

Figure 5:
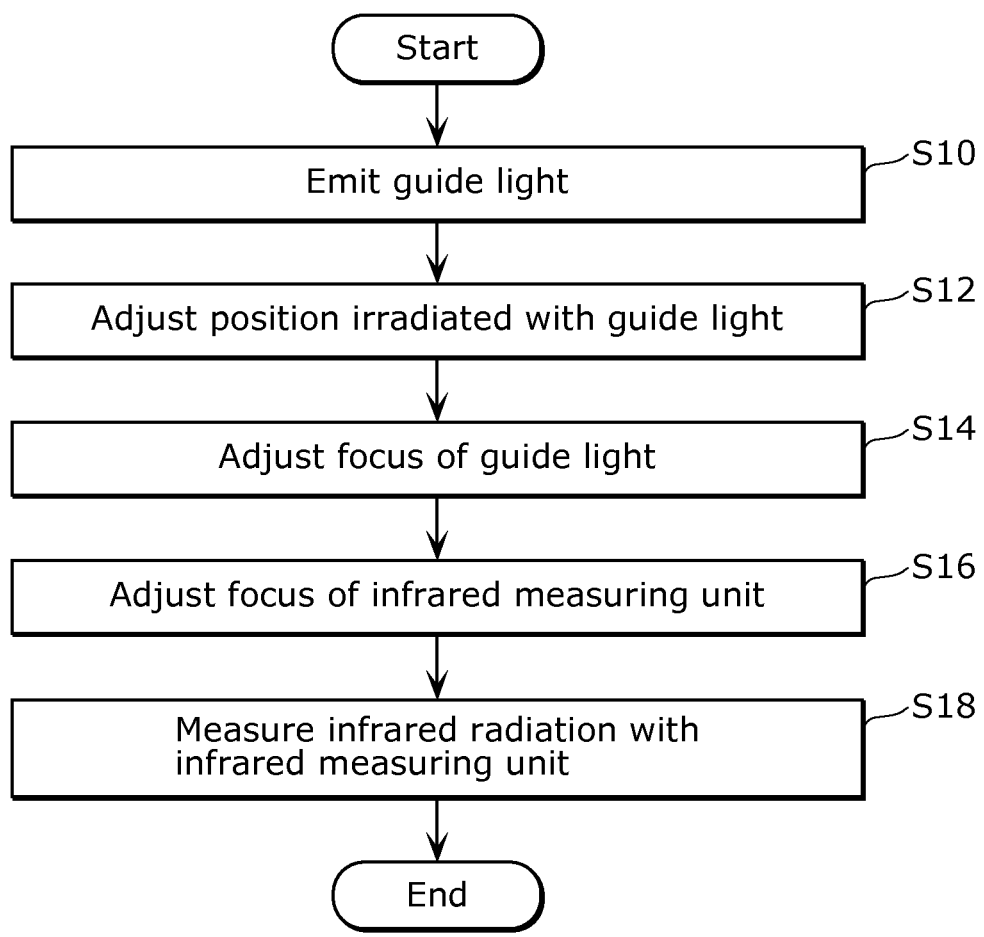
FIG. 5 is a flowchart illustrating an exemplary operation of the temperature measuring apparatus in Embodiment 1.

FIG. 5 is a flowchart illustrating an exemplary operation of the temperature measuring apparatus in Embodiment 1.

First, the temperature measuring apparatus 100 causes the guide light emitting unit 11 to emit the guide light (S10). Then, the temperature measuring apparatus 100 reflects the guide light emitted by the guide light emitting unit 11 to allow it to travel toward the object, and transmits the infrared radiation radiated from the object to allow it to enter the infrared measuring unit 10.

In the present embodiment, the temperature measuring apparatus 100 causes the near infrared light source 111 to emit the near infrared guide light. Next, the temperature measuring apparatus 100 causes the near infrared lens 112 to transmit the near infrared guide light emitted by the near infrared light source 111 and then causes the optical unit 12 to reflect the near infrared guide light to allow it to enter the measurement target object 50 (irradiate the measurement target object 50 with the near infrared guide light). Here, the measurement target object 50 may be irradiated with the guide light constantly or at certain intervals. Also, the measurement target object 50 may be irradiated at given timing specified by a user.

Here, the imaging unit 15 captures the image of the subject including the measurement target object 50, and outputs the captured image to the image processing unit 161. The imaging unit 15 may capture the image constantly or at certain intervals, similarly to the timing of the guide light irradiation. Also, the imaging unit 15 may capture the image at given timing specified by a user. Additionally, the image capturing may be started in association with the timing of the guide light irradiation.

The image processing unit 161 extracts a desired measurement target region from the image captured by the imaging unit 15. The desired measurement target region is a body region preset by a user, for example, and a human face in the present embodiment. Also, the image processing unit 161 extracts a region irradiated with the guide light on the measurement target object 50 from the image captured by the imaging unit 15. Then, the image processing unit 161 outputs to the position adjusting unit 13 information regarding the desired measurement target region and the region irradiated with the guide light.

Figure 6:
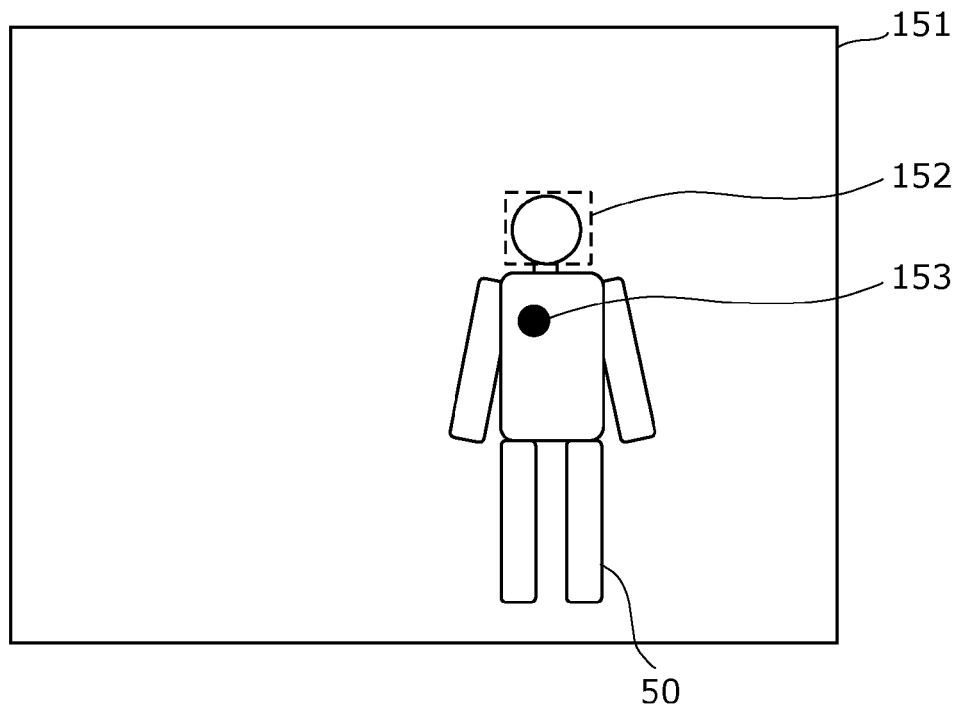
FIG. 6 is a diagram for describing an example of how an image processing unit detects a measurement target region in Embodiment 1.
Figure 7:
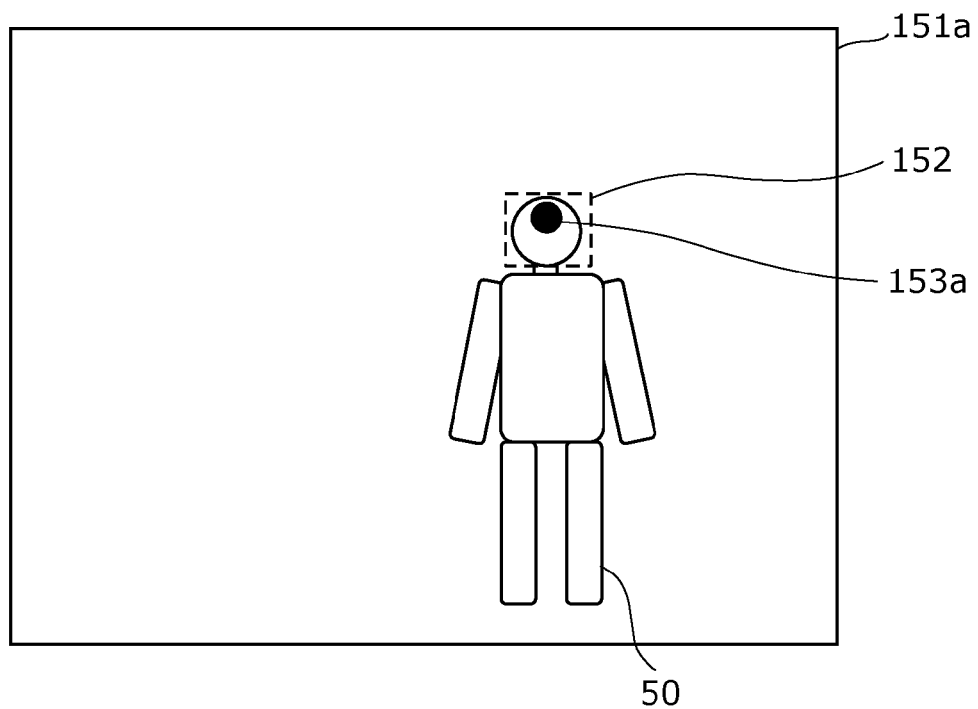
FIG. 7 is a diagram for describing an example of how the image processing unit detects the measurement target region in Embodiment 1.

Now, an example of how the image processing unit 161 detects the desired measurement target region will be described. FIGS. 6 and 7 are diagrams for describing an example of how the image processing unit detects the measurement target region in Embodiment 1.

FIG. 6 illustrates an image 151 captured by the imaging unit 15 in which a human face is detected as a body region by image processing of the image processing unit 161.

In other words, the image processing unit 161 detects a face of a human body serving as the measurement target object 50 from the image captured by the imaging unit 15, and calculates positional coordinates 152 of the face in the image. It should be noted that any method may be used to detect the face. Furthermore, the image processing unit 161 detects positional coordinates 153 of the region of the human body serving as the measurement target object 50 irradiated with the guide light. Then, the image processing unit 161 outputs the detected positional coordinates 152 and 153 to the position adjusting unit 13.

Next, the temperature measuring apparatus 100 makes a position adjustment of irradiating the measurement target region with the guide light emitted by the guide light emitting unit 11 while keeping within a predetermined range a misalignment between the optical axis of the infrared radiation entering the infrared measuring unit 10 from the measurement target region and the optical axis of the guide light emitted by the guide light emitting unit 11.

In the present embodiment, the position adjusting unit 13 controls the rotary driving unit 13a based on the information outputted from the image processing unit 161 so that the desired measurement target region is irradiated with the guide light.

FIG. 7 illustrates an image 151a after the position adjusting unit 13 controls the rotary driving unit 13a. In other words, as illustrated in FIG. 6, unless the positional coordinates 153 irradiated with the guide light and the positional coordinates 152 of the measurement target region (face) are within the predetermined range, the position adjusting unit 13 controls the rotary driving unit 13a based on the information outputted from the image processing unit 161 (the positional coordinates 152 and 153). In this manner, as illustrated in FIG. 7, the position adjusting unit 13 can keep the positional coordinates 153a irradiated with the guide light within a predetermined range from the region of the face serving as the desired measurement target region (positional coordinates 152).

Subsequently, the temperature measuring apparatus 100 adjusts the focus of the guide light emitting unit 11 (S14), and then adjust the focus of the infrared measuring unit 10 (S16).

In the present embodiment, by controlling the infrared focusing mechanism 14a and the guide light focusing mechanism 14b, the focusing unit 14 adjusts the foci of the guide light emitting unit 11 and the infrared measuring unit 10 in association with each other when the desired measurement target region is irradiated with the guide light.

More specifically, first, based on the image captured by the imaging unit 15 and processed by the image processing unit 161, the focusing unit 14 calculates a parameter of the guide light focusing mechanism 14b for minimizing the spot diameter of the guide light with which the measurement target object 50 is irradiated. Next, the focusing unit 14 controls the guide light focusing mechanism 14b based on the set parameter, so that the guide light focusing mechanism 14b adjusts the spacing between the near infrared lens 112 and the near infrared light source 111 along the optical axis.

Here, lenses having the same focal length are used for the infrared lens 102 and the near infrared lens 112. In this case, as described above, when the spacing between the near infrared lens 112 and the near infrared light source 111 along the optical axis is determined, the spacing between the infrared lens 102 and the infrared sensor 101 can also be determined, in other words, based on the parameter used for adjusting the focus of the guide light emitting unit 11, the focusing unit 14 can calculate a parameter to be used for adjusting the focus of the infrared measuring unit 10. The focusing unit 14 controls the infrared focusing mechanism 14a based on the calculated parameter, thereby adjusting the spacing between the infrared lens 102 and the infrared sensor 101.

Next, the temperature measuring apparatus 100 measures infrared radiation radiated from the measurement target region of the object with the infrared measuring unit 10 (S18).

More specifically, the temperature measuring apparatus 100 causes the infrared measuring unit 10 to measure infrared radiation radiated from the measurement target region of the object. Then, the temperature measuring apparatus 100 causes the temperature computing unit 162 to compute the temperature of the measurement target region from the infrared dose measured by the infrared sensor 101, thereby determining the temperature of the measurement target region.

[Advantageous Effects]

As described above, the temperature measuring apparatus 100 in the present embodiment allows the temperature measurement impervious to the distance between the infrared measuring unit 10 and the measurement target region, so that the temperature of the measurement target region can be measured accurately, making it possible to measure the temperature of the measurement target object accurately.

More specifically, both by using the optical unit 12 to keep the optical axes of the guide light emitting unit 11 and the infrared measuring unit 10 within a predetermined range and by adjusting the foci of the guide light emitting unit 11 and the infrared measuring unit 10 in association with each other, it is possible to minimize the field of view of the infrared measuring unit 10 with respect to the desired measurement target region of the measurement target object 50. This allows the temperature measurement impervious to the surrounding temperature of the measurement region.

Also, the temperature measuring apparatus 100 in the present embodiment includes the optical unit 12, thereby producing an advantageous effect that the infrared sensor 101 is impervious to near infrared radiation serving as the guide light.

Furthermore, with the temperature measuring apparatus 100 in the present embodiment, an image of a subject including the measurement target object 50 irradiated with the guide light is captured by the imaging unit and used, whereby the desired measurement target region and the position irradiated with the guide light coincide with each other. In this way, it is possible to carry out a precise measurement at the desired measurement target region.

Although the above description has been directed to a case in which the infrared measuring unit 10, the guide light emitting unit 11, and the optical unit 12 are mounted on the rotary driving unit 13a in the temperature measuring apparatus 100 in the present embodiment, there is no particular limitation to this. In addition to the infrared measuring unit 10, the guide light emitting unit 11, and the optical unit 12, the imaging unit 15 may be mounted on the rotary driving unit 13a.

Moreover, although the near infrared light source is used as a light source of the guide light emitting unit 11 in the present embodiment, a visible light source may be used. By using the visible light source, a user of the temperature measuring apparatus 100 according to the present invention can align the irradiation position directly. In this case, since the imaging unit 15, the image processing unit 161, and the position adjusting unit 13 can be omitted, it is possible to produce an advantageous effect of providing a less expensive temperature measuring apparatus.

[Embodiment 2]

[Configuration of Temperature Measuring Apparatus]

Figure 8:
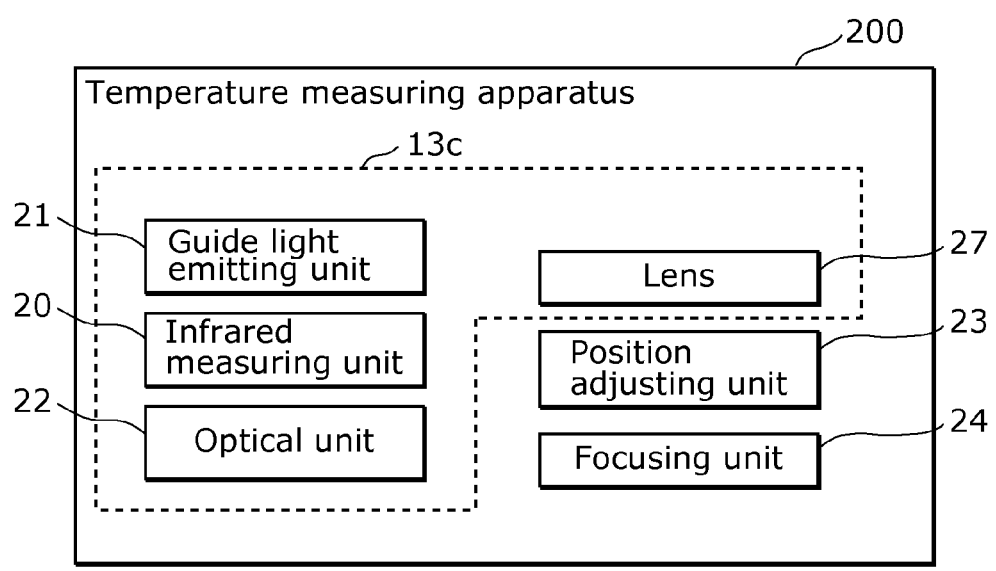
FIG. 8 illustrates an exemplary configuration of a temperature measuring apparatus in Embodiment 2.
Figure 9:
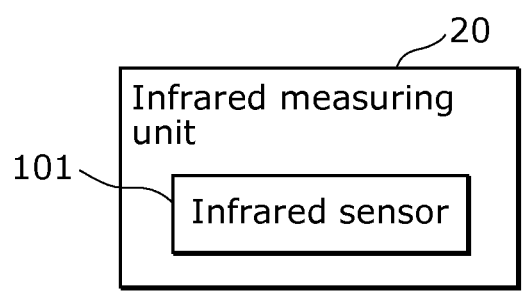
FIG. 9 illustrates an exemplary configuration of an infrared measuring unit in Embodiment 2.
Figure 10:
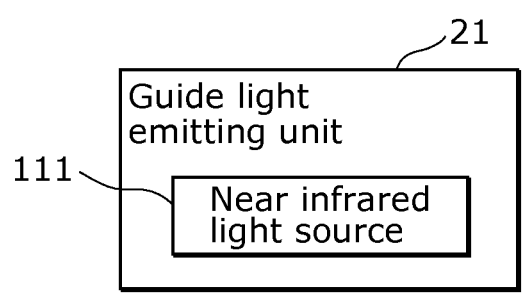
FIG. 10 illustrates an exemplary configuration of a guide light emitting unit in Embodiment 2.
Figure 11:
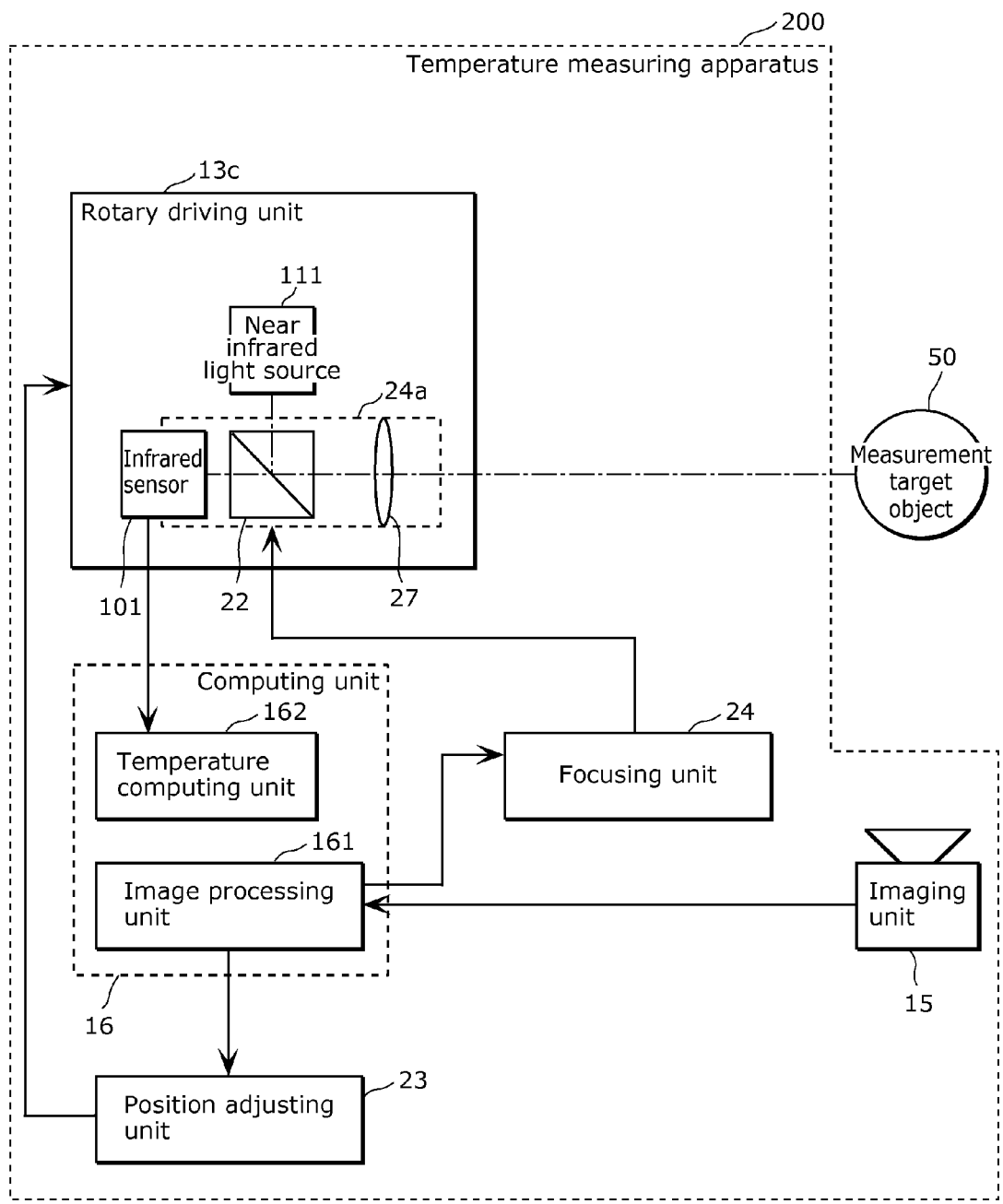
FIG. 11 illustrates one working example of the configuration of the temperature measuring apparatus in Embodiment 2.

FIG. 8 illustrates an exemplary configuration of a temperature measuring apparatus in Embodiment 2. FIG. 9 illustrates an exemplary configuration of an infrared measuring unit in Embodiment 2, and FIG. 10 illustrates an exemplary configuration of a guide light emitting unit in Embodiment 2. FIG. 11 illustrates one working example of a configuration of the temperature measuring apparatus in Embodiment 2. Incidentally, the same structural components as those in FIGS. 1 to 4 are assigned the same reference signs, and the description thereof will be omitted.

A temperature measuring apparatus 200 illustrated in FIG. 8 includes at least an infrared measuring unit 20, a guide light emitting unit 21, an optical unit 22, a position adjusting unit 23, a focusing unit 24, and a lens 27. In the following description of the present embodiment, as illustrated in FIG. 11, the temperature measuring apparatus 200 includes the imaging unit 15 and the computing unit 16 in addition to the infrared measuring unit 20, the guide light emitting unit 21, the optical unit 22, the position adjusting unit 23, the focusing unit 24, and the lens 27.

Compared with the temperature measuring apparatus 100 illustrated in FIG. 1, the temperature measuring apparatus 200 in the present embodiment includes an additional structural component of the lens 27. More specifically, the temperature measuring apparatus 200 is different in configuration from the temperature measuring apparatus 100 in that the infrared measuring unit 20 and the guide light emitting unit 21 do not have any lens inside but share the lens 27.

[Configuration of Infrared Measuring Unit 20]

As illustrated in FIGS. 9 and 11, the infrared measuring unit 20 includes the infrared sensor 101, and measures infrared radiation radiated from an object. Put another way, the infrared measuring unit 20 in the present embodiment is different in configuration from the infrared measuring unit 10 illustrated in FIG. 2 in that the infrared measuring unit 20 includes neither the infrared lens nor the infrared focusing mechanism 14a. Since other configurations have been described in Embodiment 1, the description thereof will be omitted here.

[Configuration of Guide Light Emitting Unit 21]

As illustrated in FIGS. 10 and 11, the guide light emitting unit 21 includes the near infrared light source 111, and emits near infrared guide light. Here, the guide light emitting unit 21 emits near infrared light to which the imaging unit 15 is sensitive, for example. Put another way, the guide light emitting unit 21 in the present embodiment is different in configuration from the guide light emitting unit 11 illustrated in FIG. 3 in that the guide light emitting unit 21 includes neither the near infrared lens nor the guide light focusing mechanism 14b. Since other configurations have been described in Embodiment 1, the description thereof will be omitted here.

[Configuration of Lens 27]

As illustrated in FIG. 11, the lens 27 is disposed between the optical unit 22 and the measurement target object 50, and located on the same optical axis as the infrared sensor 101 (the infrared measuring unit 20). The lens 27 transmits the guide light that has left the optical unit 22 to allow it to travel toward the measurement target object 50, and transmits infrared radiation radiated from the measurement target object 50 to allow it to enter the optical unit 22. Here, the lens 27 transmits light with a wavelength of 1 μm or longer, for example, 0.7 μm or longer. The lens 27 is formed of a material such as silicon, calcium fluoride, barium fluoride, zinc selenide or zinc sulfide, for example.

[Configuration of Optical Unit 22]

The optical unit 22 reflects the guide light emitted by the guide light emitting unit 21 to allow it to enter the lens 27, and transmits infrared radiation that has been radiated from the measurement target object 50 and left the lens 27 to allow it to enter the infrared measuring unit 20. Since the material and arrangement of the optical unit 22 are similar to those of the optical unit 12 in Embodiment 1, the description thereof will be omitted.

Incidentally, similarly to the temperature measuring apparatus 200 described in FIG. 4, the optical unit 22 may transmit the guide light emitted by the guide light emitting unit 21 to allow it to travel toward the measurement target object 50, and reflect the infrared radiation radiated from that measurement target object 50 to allow it to enter the infrared measuring unit 20.

[Configuration of Position Adjusting Unit 23]

The position adjusting unit 23 makes a position adjustment of irradiating the measurement target region of the object with the guide light emitted from the guide light emitting unit 21 while keeping within a predetermined range a misalignment between the optical axis of the infrared radiation entering the infrared measuring unit 20 from the measurement target region and the optical axis of the guide light emitted by the guide light emitting unit 21. The position adjusting unit 23 includes a rotary driving unit 13c that rotates the infrared measuring unit 20, the optical unit 22, and the lens 27 in panning and tilting directions. The position adjusting unit 23 makes the position adjustment by controlling the rotary driving unit 13c to rotary-drive the infrared measuring unit 20, the optical unit 22, and the lens 27 in the panning and tilting directions.

Here, as illustrated in FIG. 8, the infrared sensor 101 (the infrared measuring unit 20), the optical unit 22, and the lens 27 are mounted on the rotary driving unit 13c. The rotary driving unit 13c is configured using, for example, a ball head or the like, and can rotate the infrared sensor 101 (the infrared measuring unit 20), the optical unit 22, and the lens 27 in horizontal and vertical (panning and tilting) directions.

[Configuration of Focusing Unit 24]

The focusing unit 24 varies the position of at least the lens 27, thereby adjusting the foci of the infrared measuring unit 20 and the guide light emitting unit 21. The focusing unit 24 adjusts the focus of the guide light emitting unit 21 and then that of the infrared measuring unit 20. More specifically, the focusing unit 24 adjusts the focus of the guide light emitting unit 21 by varying the distance between the lens 27 and the near infrared light source 111 so as to minimize the spot diameter of the guide light to which the measurement target region is irradiated, and then adjusts the focus of the infrared measuring unit 20 by varying the position of the infrared sensor 101 to vary the distance between the infrared sensor 101 and the lens 27.

In the present embodiment, the focusing unit 24 drives a focusing mechanism 24a, thereby adjusting the foci of the infrared measuring unit 20 and the guide light emitting unit 21. In other words, the focusing mechanism 24a is a mechanism that is controlled by the focusing unit 24 and can vary the distance between the lens 27 and the near infrared light source 111 along the optical axis. The focusing mechanism 24a adjusts the foci of the infrared measuring unit 20 and the guide light emitting unit 21.

It should be noted that the arrangement and configuration of the focusing mechanism 24a are not limited to those illustrated in the figure but may be any arrangement and configuration that can change the positions of the infrared sensor 101 and the lens 27. For example, a lens advancing mechanism or the like may be used as the focusing mechanism 24a. Moreover, the focusing mechanism 24a may adjust the foci of other structural components instead of the infrared sensor 101 and the lens 27. The spacing between the near infrared light source 111 and the lens 27 may be varied.

[Operation of Temperature Measuring Apparatus 200]

Now, referring to FIGS. 5 and 11, the operation of the temperature measuring apparatus 200 configured as above will be described.

First, S10 and S12 in which the guide light emitting unit 21 is controlled so that the desired measurement target region of the measurement target object 50 is irradiated with the guide light are the same as those described in Embodiment 1. Thus, the description thereof will be omitted.

Subsequently, the temperature measuring apparatus 200 adjusts the focus of the guide light emitting unit 21 (S14), and then adjusts the focus of the infrared measuring unit 20 (S16).

In the present embodiment, based on the image processed by the image processing unit 161, the focusing unit 24 calculates a parameter of the focusing mechanism 24a for minimizing the spot diameter of the guide light with which the measurement target object 50 is irradiated. Next, the focusing unit 24 controls the focusing mechanism 24a based on the set parameter so as to move the position of the lens 27 along the optical axis, thereby adjusting the spacing between the lens 27 and the near infrared light source 111 along the optical axis.

Here, when f denotes a focal length of the lens 27 with respect to a wavelength of the near infrared light source 111, a denotes a spacing between the near infrared light source 111 and the lens 27 and b denotes a spacing between the lens 27 and the measurement target region of the measurement target object 50, $1/a+1/b=1/f$ holds according to a known lens formula.

Also, since there is a certain range of the wavelength to which the infrared sensor 101 is sensitive, the infrared sensor 101 (the infrared measuring unit 10) is not always in focus even when the near infrared light source 111 (the guide light emitting unit 11) is in focus. Thus, the focus of the infrared sensor 101 (the infrared measuring unit 10) is adjusted.

Here, the center wavelength of infrared radiation is 10 μm, the focal length of the lens 27 at a wavelength of 10 μm is given by f', and the spacing between the infrared sensor 101 and the lens 27 is given by a'. In this case, when the position of the infrared sensor 101 is changed by controlling the focusing mechanism 24a so as to satisfy $1/a'+1/b=1/f'$, the focus of the infrared measuring unit 20 including the infrared sensor 101 is achieved on the desired measurement target region. Here, $1/a'=1/f'-1/f+1/a$ and f and f' are known. Thus, if a is given, a can be determined by calculation.

It should be noted that the position of the near infrared light source 111 may be varied to vary the spacing a between the near infrared light source 111 and the lens 27 so as to satisfy the equation noted above. At this time, the focusing mechanism 24a may be any mechanism that varies the spacing between the near infrared light source 111 and the lens 27.

Next, the temperature measuring apparatus 200 measures infrared radiation radiated from the measurement target region of the object with the infrared measuring unit 20 (S18). Incidentally, since the operation in S18 has been described in Embodiment 1, the description thereof will be omitted.

[Advantageous Effects]

As described above, with the temperature measuring apparatus 200 in the present embodiment, it becomes possible to measure the temperature of the measurement target object accurately.

More specifically, in addition to the advantageous effect described in Embodiment 1, sharing the lens produces another advantageous effect of allowing the temperature measurement impervious to the surrounding temperature of the measurement region with small and inexpensive configurations.

The lens can be shared because, where a denotes the spacing between the lens 27 and the near infrared light source 111 when the guide light is in focus, by moving the infrared sensor 101 so that the spacing a' between the infrared sensor 101 and the lens 27 satisfies $a'=1/f'-1/f+1/a$, the focus of the infrared measuring unit 20 is achieved. At this time, the spot of the guide light is kept in focus. Thus, it is easy to confirm the measurement region. In other words, the temperature measuring apparatus 200 in the present embodiment needs only one lens, thus allowing the temperature measurement impervious to the surrounding temperature of the measurement region with small and inexpensive configurations.

[Embodiment 3]

[Configuration of Temperature Measuring Apparatus]

In Embodiment 2, the description has been directed to an exemplary case of including the focusing mechanism 24a capable of varying the positions of the lens 27 and the near infrared light source 111 in order to adjust the foci of the infrared measuring unit 20 and the guide light emitting unit 21. However, there is no particular limitation to this. The description of the present embodiment will be directed to an exemplary case of including a focusing mechanism 34a capable of varying the position of the lens 27 alone.

Figure 12:
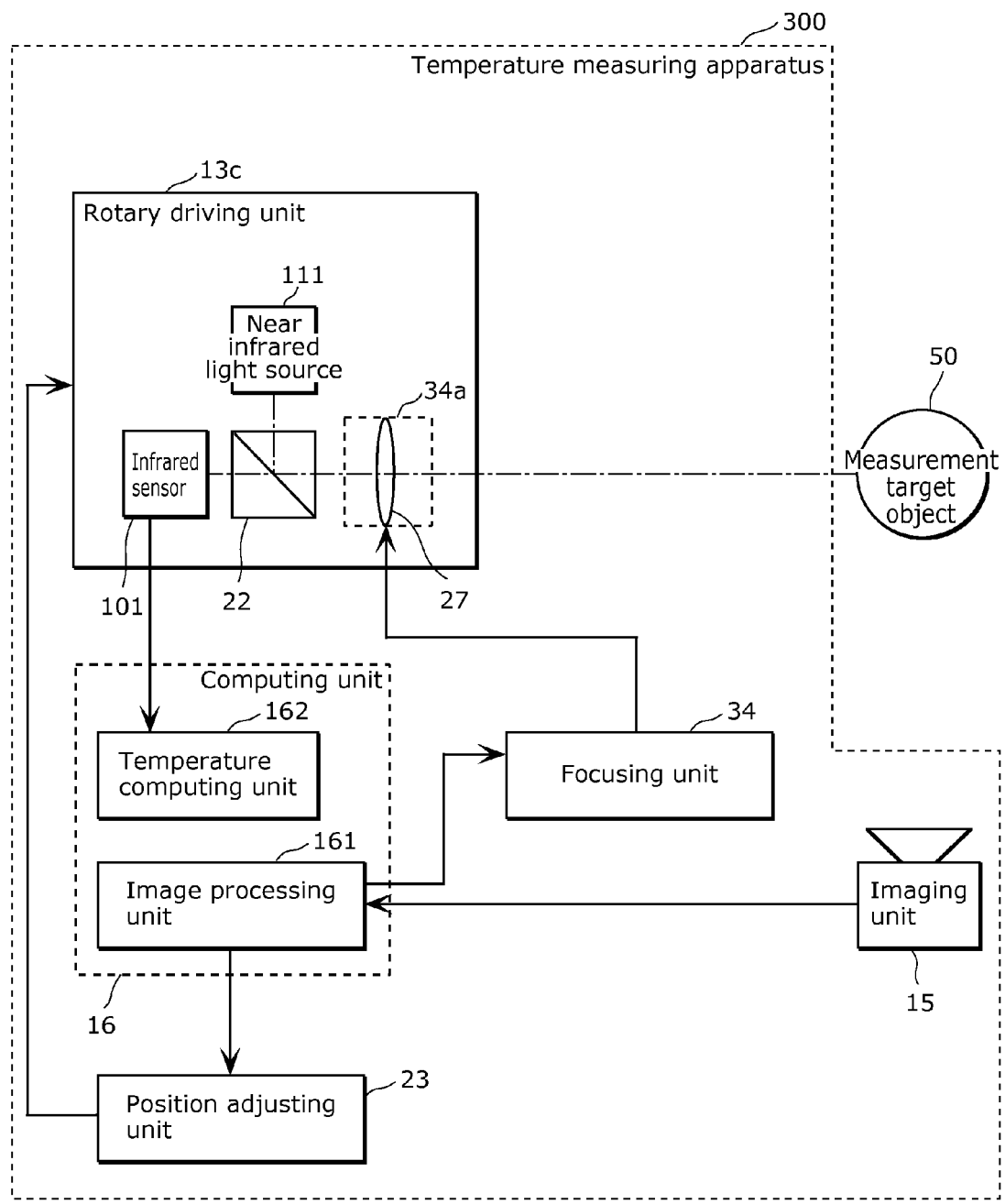
FIG. 12 illustrates one working example of a configuration of a temperature measuring apparatus in Embodiment 3.

FIG. 12 illustrates one working example of a configuration of a temperature measuring apparatus in Embodiment 3. In FIG. 12, the same structural components as those in FIG. 11 are assigned the same reference signs, and the description thereof will be omitted. Also, since the configuration of the temperature measuring apparatus in Embodiment 3 is similar to that illustrated in FIGS. 8 to 10 in Embodiment 2, the description thereof will be omitted. The following description will be mainly directed to points different from Embodiment 2.

A temperature measuring apparatus 300 illustrated in FIG. 12 is different from the temperature measuring apparatus 200 illustrated in FIG. 11 in the configurations of a focusing unit 34 and a focusing mechanism 34a. More specifically, the temperature measuring apparatus 300 illustrated in FIG. 12 is different from the temperature measuring apparatus 200 illustrated in FIG. 11 in that the infrared sensor 101 is not moved.

[Configuration of Focusing Unit 34]

In the temperature measuring apparatus 300, the infrared sensor 101 and the near infrared light source 111 are provided equidistantly from the lens 27.

The focusing unit 34 controls the focusing mechanism 34a to move the position of the lens 27 alone, thereby adjusting the foci of the infrared measuring unit 20 and the guide light emitting unit 21.

More specifically, the focusing unit 34 adjusts the focus of the guide light emitting unit 21 by varying the distance between the lens 27 and the near infrared light source 111 (the guide light emitting unit 21) so as to minimize the spot diameter of the guide light with which the measurement target region is irradiated. Thereafter, the focusing unit 34 further varies the position of the lens 27 to vary the distance between the infrared sensor 101 (the infrared measuring unit 20) and the lens 27, thereby adjusting the focus of the infrared measuring unit 20.

[Operation of Temperature Measuring Apparatus 300]

Now, referring to FIGS. 5 and 12, the operation of the temperature measuring apparatus 300 configured as above will be described.

First, S10 and S12 in which the guide light emitting unit 21 is controlled so that the desired measurement target region of the measurement target object 50 is irradiated with the guide light are the same as those described in Embodiment 1. Thus, the description thereof will be omitted.

Subsequently, the temperature measuring apparatus 300 adjusts the focus of the guide light emitting unit 21 (S14), and then adjust the focus of the infrared measuring unit 20 (S16).

In the present embodiment, based on the image processed by the image processing unit 161, the focusing unit 34 calculates a parameter of the focusing mechanism 34a for minimizing the spot diameter of the guide light with which the measurement target object 50 is irradiated. Next, the focusing unit 34 controls the focusing mechanism 34a based on the set parameter so as to move the position of the lens 27 along the optical axis, thereby adjusting the spacing between the lens 27 and the near infrared light source 111 along the optical axis.

Here, when f denotes a focal length of the lens 27 with respect to a wavelength of the near infrared light source 111, a denotes a spacing between the near infrared light source 111 and the lens 27 and b denotes a spacing between the lens 27 and the measurement target region of the measurement target object 50, $1/a+1/b=1/f$ holds according to a known lens formula.

Also, since there is a certain range of the wavelength to which the infrared sensor 101 is sensitive, the infrared sensor 101 (the infrared measuring unit 20) is not always in focus even when the near infrared light source 111 (the guide light emitting unit 21) is in focus. Thus, the focus of the infrared sensor 101 (the infrared measuring unit 20) is adjusted.

Here, the center wavelength of infrared radiation is 10 μm, the focal length of the lens 27 at a wavelength of 10 μm is given by f', and the spacing between the infrared sensor 101 and the lens 27 is given by a+Δa. In this case, there is Δa satisfying $1/(a+\Delta a)+1/(b-\Delta a)=1/f'$. Accordingly, by moving the lens 27 further by a after the spot of the guide light comes into focus (the focus of the guide light emitting unit 21 is achieved), the focus of the infrared measuring unit 20 including the infrared sensor 101 is achieved on the desired measurement target region.

Next, the temperature measuring apparatus 300 measures infrared radiation radiated from the measurement target region of the object with the infrared measuring unit 20 (S18). Incidentally, since the operation in S18 has been described in Embodiment 1, the description thereof will be omitted.

[Advantageous Effects]

As described above, with the temperature measuring apparatus 300 in the present embodiment, it becomes possible to measure the temperature of the measurement target object accurately.

More specifically, by moving the lens 27 by Δa after the spot of the guide light comes into focus, the focus of the infrared measuring unit 20 is achieved. Thus, only one lens 27 is needed, allowing the temperature measurement impervious to the surrounding temperature of the measurement region with small and inexpensive configurations.

Also, with the temperature measuring apparatus 300 in the present embodiment, only the lens 27 needs to be moved for focus adjustment. Thus, since the infrared sensor 101 that has less driving mechanisms and is connected with an electronic circuit does not need to be moved, there is an advantage that the driving mechanisms are simplified.

In the present embodiment, the optical unit 22 is configured by the wavelength selective prism. However, there is no particular limitation to this, and a wavelength selective mirror may be used instead.

[Embodiment 4]

In the present embodiment, an application product in which the temperature measuring apparatuses in Embodiments 1 to 3 are installed will be described.

Figure 13:
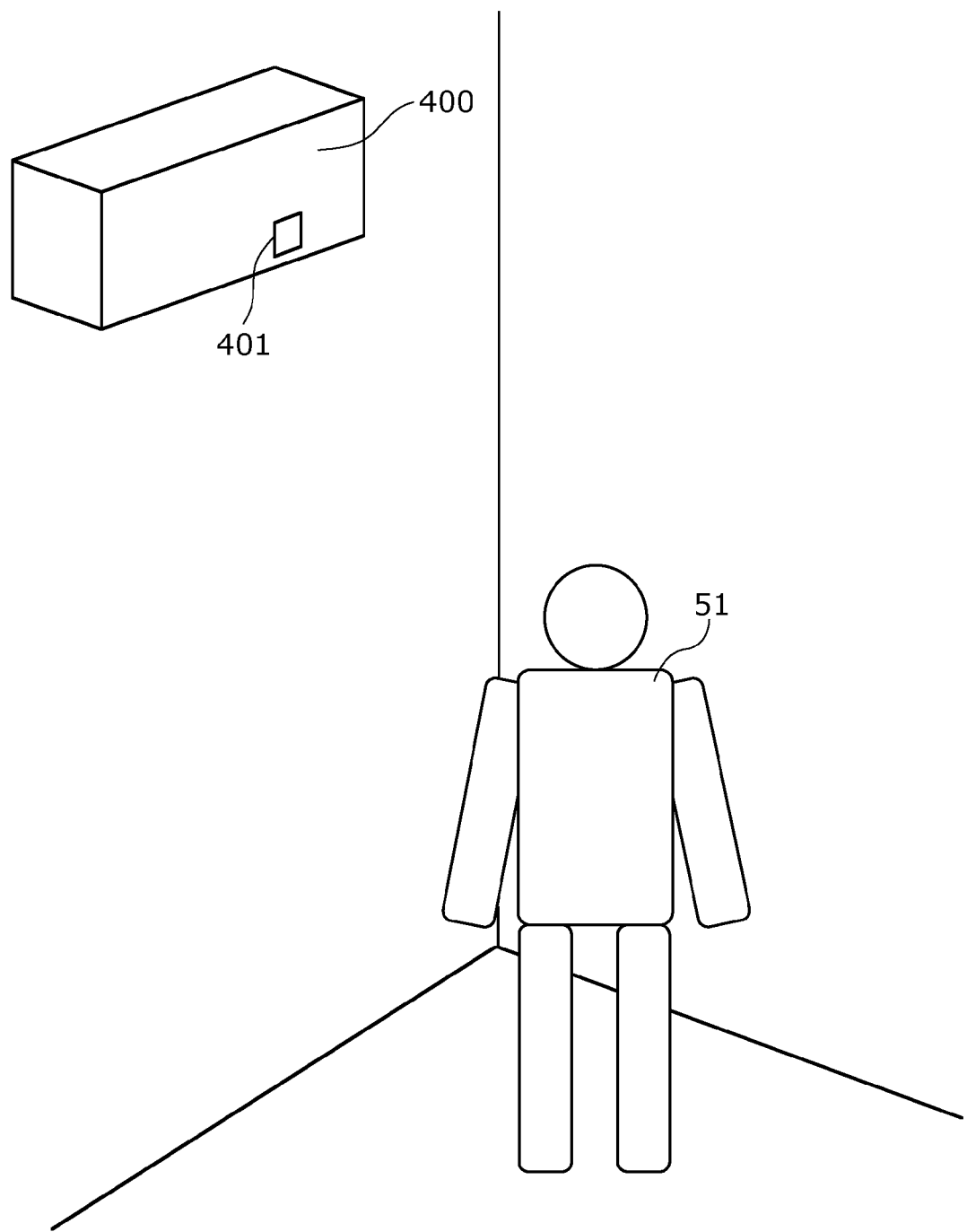
FIG. 13 illustrates an example of an interior of a room in which a heating and cooling apparatus is installed in Embodiment 4.

FIG. 13 illustrates an example of an interior of a room in which a heating and cooling apparatus in Embodiment 4 is installed. In FIG. 13, a person 51 who is in the room where a heating and cooling apparatus 400 is installed is illustrated.

The heating and cooling apparatus 400 illustrated in FIG. 13 includes a temperature measuring apparatus 401, and blows warm air and cool air according to its setting. In other words, the heating and cooling apparatus 400 is similar to an apparatus generally known as an air conditioner. Furthermore, the temperature measuring apparatus 401 installed in the heating and cooling apparatus 400 is any of the temperature measuring apparatuses in Embodiments 1 to 3 described above.

The temperature measuring apparatus 401 measures the temperature of a skin of the person 51 as the measurement target region of the measurement target object. A skin temperature measurement region in the person 51 is, for example, a face or a hand exposed from the clothing of the person 51.

The temperature measuring apparatus 401 captures an image of the person 51 with the imaging unit 15 mounted thereon, and extracts the face or the hand to direct the guide light toward the face or the hand of the person. By using the above-noted near infrared light as the guide light, it is possible to measure the skin temperature without the person 51 being aware of it.

Here, the skin temperature of the face or the hand when the person 51 feels comfortable may be learned and stored in a database. In theory, an average skin temperature of 33° C. to 34° C. is generally considered comfortable. Thus, in order to learn the relationship between comfortableness and skin temperature, it is appropriate to control the operation of the heating and cooling apparatus 400 so that the skin temperature to be measured is 33° C. to 34° C. Then, when the person 51 raises or lowers the temperature setting, the skin temperature at that time can be stored, thereby learning the skin temperature at which the person 51 feels comfortable.

In this manner, only by measuring the skin temperature of a person with the temperature measuring apparatus 401, it is possible to obtain the heating and cooling apparatus 400 that performs heating and cooling to achieve a comfortable temperature without the need for the temperature setting by the person 51.

Incidentally, even when there is more than one person 51, each person can be identified by the imaging unit 15. Accordingly, the relationship between skin temperature and comfortableness of each person can be stored in a database, thus allowing cool and warm air control for each person. Each person can be identified by face pattern matching or the like.

[Embodiment 5]

Embodiment 4 has been directed to the case in which the temperature measuring apparatuses in Embodiments 1 to 3 are mounted on the heating and cooling apparatus. However, there is no particular limitation to this. In the present embodiment, an exemplary case in which the temperature measuring apparatuses in Embodiments 1 to 3 are mounted on a rear-view mirror or a steering wheel of a vehicle will be described.

Figure 14:
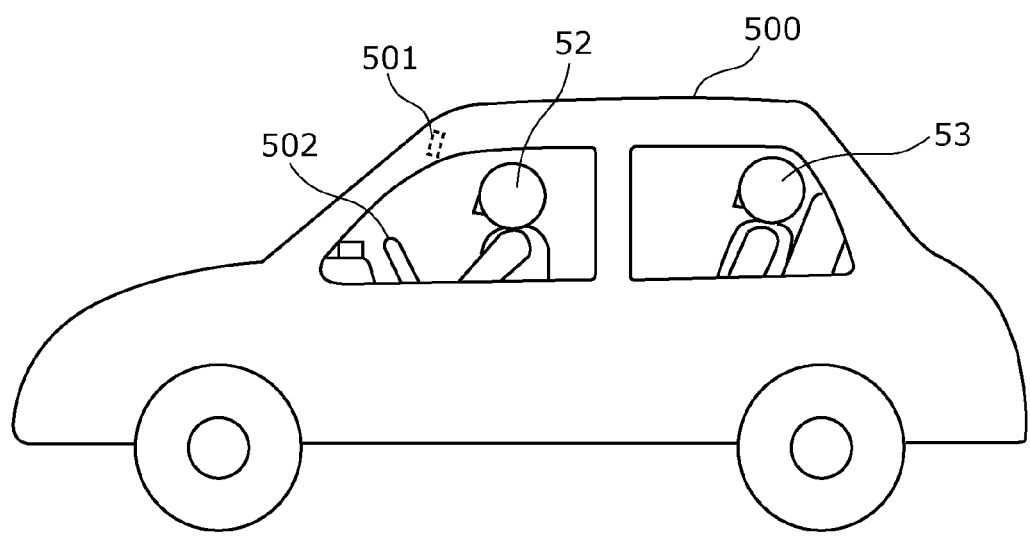
FIG. 14 illustrates an example of a case in which a temperature measuring apparatus is mounted on a vehicle in Embodiment 5.
Figure 15A:
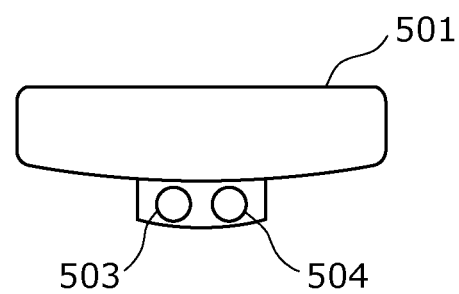
FIG. 15A illustrates an example of a case in which the temperature measuring apparatus is mounted on a rear-view mirror in Embodiment 5.

FIG. 14 illustrates an example of a case in which the temperature measuring apparatus is mounted on a vehicle in Embodiment 5. FIG. 15A illustrates an example of a case in which the temperature measuring apparatus is mounted on a rear-view mirror in Embodiment 5, and FIG. 15B illustrates an example of a case in which the temperature measuring apparatus is mounted on a steering wheel in Embodiment 5.

A vehicle 500 illustrated in FIG. 14 includes a rear-view mirror 501 and a steering wheel 502. In an interior of the vehicle 500 illustrated in FIG. 14, a person 52 serving as a driver and a person 53 sitting in a back seat are shown.

Figure 15B:
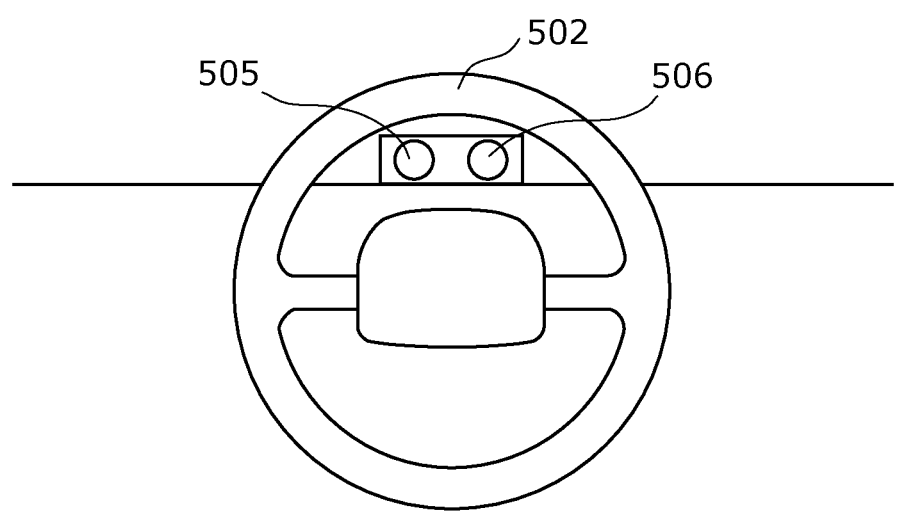
FIG. 15B illustrates an example of a case in which the temperature measuring apparatus is mounted on a steering wheel in Embodiment 5.

When the temperature measuring apparatuses in Embodiments 1 to 3 are mounted on the vehicle 500, they may be mounted on the rear-view mirror 501 as illustrated in FIG. 15A or mounted on the steering wheel 502 as illustrated in FIG. 15B.

The rear-view mirror 501 illustrated in FIG. 15A includes a temperature measuring apparatus 503 and a camera 504. The temperature measuring apparatus 503 is any of the temperature measuring apparatuses in Embodiments 1 to 3 described above. The camera 504 is any of the imaging units described in Embodiments 1 to 3.

Incidentally, the temperature measuring apparatus 503 may be a partial configuration of any of the temperature measuring apparatuses in Embodiments 1 to 3 described above, and a remaining configuration thereof may be mounted behind the rear-view mirror 501.

The temperature measuring apparatus 503 mounted as above captures an image of the person 52 or 53 with the camera 504, and extracts the face or the hand to direct the guide light toward the face or the hand of the person. By using the above-noted near infrared light as the guide light, it is possible to measure the skin temperature without the person 52 or 53 being aware of it. Then, the measurement result of the temperature measuring apparatus 503 or 505 is used to control the heating and cooling apparatus in the vehicle.

This makes it possible to control the heating and cooling apparatus in the vehicle to achieve a comfortable temperature without the need for the temperature setting by the person 52 or 53.

Incidentally, even when there is more than one person in the vehicle 500, each person can be identified by the camera (the imaging unit 15), thus allowing cool and warm air control for each person.

Furthermore, the steering wheel 502 illustrated in FIG. 15B includes a temperature measuring apparatus 505 and a camera 506. The temperature measuring apparatus 505 is any of the temperature measuring apparatuses in Embodiments 1 to 3 described above. Incidentally, the temperature measuring apparatus 505 may be a partial configuration of any of the temperature measuring apparatuses in Embodiments 1 to 3 described above, and a remaining configuration thereof may be mounted on a dashboard, etc, of the vehicle 500. The camera 506 is any of the imaging units described in Embodiments 1 to 3.

The temperature measuring apparatus 505 mounted as above captures an image of the person 52 with the camera 506, and extracts the face or the hand to direct the guide light toward the face or the hand of the person. By using the above-noted near infrared light as the guide light, it is possible to measure the skin temperature without the person 52 being aware of it.

Then, the heating and cooling apparatus in the vehicle can also be controlled based on the measurement result of the temperature measuring apparatus 505 (skin temperature). In other words, with the present embodiment, it is possible to control the heating and cooling apparatus in the vehicle so as to achieve a comfortable temperature without the need for the temperature setting by the person 52.

It should be noted that a physical condition of the person 52 may be managed based on the measurement result of the temperature measuring apparatus 505 (skin temperature). In this case, for example, the vehicle 500 is controlled so as not to start an engine of the vehicle 500 when the physical condition of the person 52 is determined to be poor based on the measurement result of the temperature measuring apparatus 505 (skin temperature), so that the temperature measuring apparatus 505 can be utilized for health care and security assurance for the person 52.

Although the heating and cooling apparatus in the vehicle is controlled using the temperature measuring apparatus 503 in the above description, there is no particular limitation to this. The temperature measuring apparatus 503 may be used for the health care of not only the person 52 but also the person 53.

[Advantageous Effects]

As described above, the present embodiment allows the temperature measurement impervious to the distance between the infrared measuring unit and the measurement target region, so that the temperature of the measurement target region can be measured accurately, making it possible to measure the temperature of the measurement target object accurately.

In the present embodiment, only by measuring the skin temperature of a person with the temperature measuring apparatus, it is possible to perform heating and cooling to achieve a comfortable temperature without the need for the temperature setting by the person 52 serving as a driver of the vehicle 500 or the person 53 serving as a fellow passenger. Additionally, only by measuring the skin temperature of a person with the temperature measuring apparatus, it is possible to perceive the fever of the person 52 serving as the driver or the person 53 serving as the fellow passenger and manage the physical condition of the person.

Although the temperature measuring apparatus and the temperature measuring method for measuring the temperature of an object according to one or more aspects of the present invention have been described above based on the embodiments, the present invention is not limited to these embodiments. As long as not departing from the purport of the present invention, many variations of the above embodiment conceivable by a person skilled in the art and modes configured by the combination of the structural components in different embodiments may be included in the scope of one or more aspects of the present invention.

For example, in each embodiment described above, each structural component may be constituted by dedicated hardware or be realized by executing a software program suitable for each structural component. Each structural component may be realized by a program execution unit such as a CPU or a processor reading out and executing a software program stored in a hard disk or a recording medium such as a semiconductor memory.

INDUSTRIAL APPLICABILITY

The temperature measuring apparatus according to the present invention allows the temperature measurement impervious to the surrounding temperature of the measurement region, and is useful as a non-contact arbitrary position temperature measuring apparatus or the like. Also, the temperature measuring apparatus according to the present invention is applicable to a temperature sensor or the like of a heating and cooling apparatus. Furthermore, the heating and cooling apparatus according to the present invention can control the comfortable temperature based on the skin temperature of the person, and is useful as a heating and cooling apparatus that saves trouble of temperature setting.

REFERENCE SIGNS LIST 10, 20 Infrared measuring unit
11, 21 Guide light emitting unit
12, 22 Optical unit
13, 23 Position adjusting unit
13a, 13c Rotary driving unit
14, 24, 34 Focusing unit
14a Infrared focusing mechanism
14b Guide light focusing mechanism
15 Imaging unit
16 Computing unit 24a, 34a Focusing mechanism
27 Lens
50 Measurement target object
51, 52, 53 Person
100, 200, 300, 401, 503, 505 Temperature measuring apparatus
101 Infrared sensor
102 Infrared lens
111 Near infrared light source
112 Near infrared lens
151, 151a Image
152, 153, 153a Positional coordinates
161 Image processing unit
162 Temperature computing unit
400 Heating and cooling apparatus
500 Vehicle
501 Rear-view mirror
502 Steering wheel
504, 506 Camera
900 Human body temperature measuring apparatus
902 Photographing unit
903 Image analysis unit
904 Infrared dose measuring unit
905 Movable unit
906 Direction control means
907 Distance measuring unit
909 Temperature checking unit
910 Temperature database

The invention claimed is:

1. A temperature measuring apparatus comprising:
an infrared measuring unit configured to measure infrared radiation radiated from a measurement target region of an object;
a guide light emitting unit configured to emit guide light;
an optical unit configured to (i) reflect or transmit the guide light emitted by the guide light emitting unit to allow the guide light to travel toward the object, and (ii) transmit or reflect the infrared radiation radiated from the object to allow the infrared radiation to enter the infrared measuring unit;
a position adjusting unit configured to make a position adjustment of irradiating the measurement target region with the guide light emitted by the guide light emitting unit while keeping within a predetermined range a misalignment between an optical axis of the infrared radiation entering the infrared measuring unit from the measurement target region and an optical axis of the guide light emitted by the guide light emitting unit; and
a focusing unit configured to adjust a focus of the infrared measuring unit and a focus of the guide light emitting unit,
wherein the focusing unit is configured to minimize a field of view of the infrared measuring unit with respect to the measurement target region by adjusting the focus of the guide light emitting unit and then adjusting the focus of the infrared measuring unit.

2. The temperature measuring apparatus according to claim 1,
wherein the focusing unit is configured to:
adjust the focus of the guide light emitting unit by making an adjustment of minimizing a spot diameter of the guide light with which the measurement target region is irradiated, and
after adjusting the focus of the guide light emitting unit, adjust the focus of the infrared measuring unit based on a result of adjusting the focus of the guide light emitting unit.

3. The temperature measuring apparatus according to claim 1,
wherein the position adjusting unit includes a rotary driving unit configured to rotate the infrared measuring unit, the guide light emitting unit, and the optical unit in panning and tilting directions, and
the position adjusting unit is configured to make the position adjustment by controlling the rotary driving unit so as to rotary-drive the infrared measuring unit, the guide light emitting unit, and the optical unit in the panning and tilting directions.

4. The temperature measuring apparatus according to claim 3, further comprising:
an imaging unit configured to capture an image of the object; and
an image processing unit configured to process the image captured by the imaging unit,
wherein the position adjusting unit is configured to make the position adjustment of irradiating the measurement target region with the guide light emitted by the guide light emitting unit by controlling the rotary driving unit according to an output of the image processing unit so as to rotary-drive the infrared measuring unit, the guide light emitting unit, and the optical unit in the panning and tilting directions.

5. The temperature measuring apparatus according to claim 4,
wherein the guide light emitting unit is configured to emit near infrared light to which the imaging unit is sensitive.

6. The temperature measuring apparatus according to claim 1,
wherein the infrared measuring unit includes an infrared sensor, and an infrared lens that is disposed on a same optical axis as the infrared sensor,
the guide light emitting unit includes a near infrared light source, and a near infrared lens that is disposed on a same optical axis as the near infrared light source, and
the focusing unit includes:
a first focusing unit configured to adjust the focus of the guide light emitting unit by varying a distance between the near infrared light source and the near infrared lens; and
a second focusing unit configured to adjust the focus of the infrared measuring unit by varying a distance between the infrared sensor and the infrared lens after the first focusing unit adjusts the focus of the guide light emitting unit.

7. The temperature measuring apparatus according to claim 6,
wherein the first focusing unit is configured to vary the distance between the near infrared light source and the near infrared lens to minimize a spot diameter of the guide light with which the measurement target region is irradiated, and
the second focusing unit is configured to vary the distance between the infrared sensor and the infrared lens according to the distance varied by the first focusing unit.

8. The temperature measuring apparatus according to claim 7,
wherein the infrared lens and the near infrared lens have a same focal length, and
the second focusing unit is configured to vary the distance between the infrared sensor and the infrared lens to be equal to the distance between the near infrared light source and the near infrared lens varied by the first focusing unit.

9. The temperature measuring apparatus according to claim 1, further comprising
a lens that is disposed between the optical unit and the object and located on a same optical axis as the infrared measuring unit,
wherein the infrared measuring unit includes an infrared sensor,
the guide light emitting unit includes a near infrared light source, and is configured to emit near infrared guide light,
the lens (i) transmits the guide light that has left the optical unit to allow the guide light to travel toward the object, and (ii) transmits the infrared radiation radiated from the object to allow the infrared radiation to enter the optical unit, and
the focusing unit is configured to adjust the focus of the guide light emitting unit and the focus of the infrared measuring unit by varying a position of at least the lens.

10. The temperature measuring apparatus according to claim 9,
wherein the focusing unit is configured to adjust the focus of the guide light emitting unit by varying a distance between the lens and the near infrared light source to minimize a spot diameter of the guide light with which the measurement target region is irradiated, and then adjust the focus of the infrared measuring unit by varying a position of the infrared sensor to vary a distance between the infrared sensor and the lens.

11. The temperature measuring apparatus according to claim 9,
wherein the focusing unit is configured to adjust the focus of the guide light emitting unit by varying a distance between the lens and the near infrared light source to minimize a spot diameter of the guide light with which the measurement target region is irradiated, and then adjust the focus of the infrared measuring unit by varying a position of the lens to vary a distance between the infrared sensor and the lens.

12. A heating and cooling apparatus comprising the temperature measuring apparatus according to claim 1.

13. A vehicle rear-view mirror comprising the temperature measuring apparatus according to claim 1.

14. A vehicle steering wheel comprising the temperature measuring apparatus according to claim 1.

15. A temperature measuring method comprising:
measuring by an infrared measuring unit infrared radiation radiated from a measurement target region of an object;
causing a guide light emitting unit to emit guide light;
(i) reflecting or transmitting the guide light emitted by the guide light emitting unit to allow the guide light to travel toward the object, and (ii) transmitting or reflecting the infrared radiation radiated from the object to allow the infrared radiation to enter the infrared measuring unit;
making a position adjustment of irradiating the measurement target region with the guide light emitted by the guide light emitting unit while keeping within a predetermined range a misalignment between an optical axis of the infrared radiation entering the infrared measuring unit from the measurement target region and an optical axis of the guide light emitted by the guide light emitting unit; and
adjusting a focus of the infrared measuring unit and a focus of the guide light emitting unit,
wherein, in the adjusting, a field of view of the infrared measuring unit with respect to the measurement target region is minimized by adjusting the focus of the guide light emitting unit and then adjusting the focus of the infrared measuring unit.

* * * * *